United States Patent
Egilsson et al.

(10) Patent No.: US 7,146,375 B2
(45) Date of Patent: Dec. 5, 2006

(54) INFERENCE CONTROL METHOD IN A DATA CUBE

(75) Inventors: Ágúst S. Egilsson, Palo Alto, CA (US); Hákon Gudbjartsson, Reykjavik (IS)

(73) Assignee: deCODE genetics, ehf, Reykjavik (IE)

( * ) Notice: Subject to any disclaimer, the term of this patent is extended or adjusted under 35 U.S.C. 154(b) by 1026 days.

(21) Appl. No.: 10/057,314

(22) Filed: Jan. 25, 2002

(65) Prior Publication Data

US 2003/0145004 A1    Jul. 31, 2003

(51) Int. Cl.
    *G06F 17/30*    (2006.01)
(52) U.S. Cl. .......................................... 707/102; 707/2
(58) Field of Classification Search ................ 707/1, 707/2, 3, 5, 100, 101, 102; 345/440; 702/16, 702/28; 712/11
See application file for complete search history.

(56) References Cited

U.S. PATENT DOCUMENTS

| | | | |
|---|---|---|---|
| 6,275,824 B1 | 8/2001 | O'Flaherty et al. ............ 707/9 |
| 6,542,895 B1 * | 4/2003 | DeKimpe et al. ........... 707/101 |
| 6,546,395 B1 * | 4/2003 | DeKimpe et al. ........... 707/101 |
| 6,578,028 B1 * | 6/2003 | Egilsson et al. ................ 707/2 |
| 6,633,882 B1 * | 10/2003 | Fayyad et al. .............. 707/101 |
| 6,654,764 B1 * | 11/2003 | Kelkar et al. ............... 707/102 |

OTHER PUBLICATIONS

Shannon, C.E., "A Mathematical Theory of Communication," *The Bell System Technal Journal* 27(3):379-423 and 623-657 (1948).

* cited by examiner

*Primary Examiner*—Apu M. Mofiz
(74) *Attorney, Agent, or Firm*—Hamilton, Brook, Smith & Reynolds, P.C.

(57) ABSTRACT

A system for editing the dimension structure associated with a data cube is revealed. The editing may be used to enforce given criteria on the cube. This includes modifying the cube in order to satisfy regulations requiring researchers to protect information about individuals, such as medical, genealogy and genetics records. The inference control methods disclosed therefore enable safe aggregated datasets to be released to researchers. When combined with information theoretic methods, the invention method of editing the dimension structures may be used to express clearly and discover correlations that exist in the dataset. This mining of the data and editing of the dimension structure allows the user of a simple multidimensional cube viewer to visually verify the patterns discovered.

17 Claims, 10 Drawing Sheets

$i^{th}$ Dimension Table

| | Di:0 | ... | Di:L$_i$ | ... |
|---|---|---|---|---|
| Row 1 | | | | |
| ... | | | | |

402

During Rewriting of the $i^{th}$ Dimension Table

| | Di:0 | Ri:0 | ... | Di:L$_i$ | Ri:L$_i$ | ... |
|---|---|---|---|---|---|---|
| Row 1 | | | | | | |
| ... | | | | | | |

403

After rewriting of the $i^{th}$ Dimension Table

| | Di:0 | Ri:0 | ... | Ri:(L$_i$-1) | Di:L$_i$ | ... |
|---|---|---|---|---|---|---|
| Row 1 | | | | | | |
| ... | | | | | | |

FIG. 6

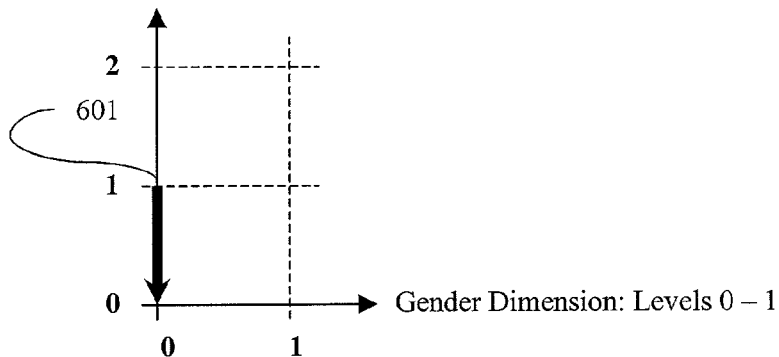

Location Dimension: Levels 0 – 2

601

Gender Dimension: Levels 0 – 1

604

2nd Dimension Table: Location

| Location Hierarchy | Level – 0 "City" | Level – 1 "County" | Level – 2 "State" |
|---|---|---|---|
| Row 1 | Berkeley | Alameda County | California |
| Row 2 | Oakland | Alameda County | California |
| Row 3 | Palo Alto | Santa Clara County | California |
| Row 4 | San Jose | Santa Clara County | California |

603

1st Dimension Table: Gender

| Gender Hierarchy | Level – 0 "Gender" | Level – 1 "All" |
|---|---|---|
| Row 1 | Male | Males & Females |
| Row 2 | Female | Males & Females |

602

Fact Table Summary

| Infections Study | Gender | City | Count(distinct ID) |
|---|---|---|---|
|  | Male | Berkeley | 2 |
|  | Female | Berkeley | 7 |
|  | Male | Oakland | 16 |
|  | Female | Oakland | 15 |
|  | Male | Palo Alto | 7 |
|  | Female | Palo Alto | 6 |
|  | Male | San Jose | 14 |
|  | Female | San Jose | 12 |

FIG. 7

Original 2nd Dimension Table: Location Hierarchy — 701

| Level – 0 "City" | Level – 1 "County" | Level – 2 "State" |
|---|---|---|
| Berkeley | Alameda County | California |
| Oakland | Alameda County | California |
| Palo Alto | Santa Clara County | California |
| San Jose | Santa Clara County | California |

New 2nd Dimension Table: Before Rewriting — 702

| D2:0 | R2:0 | D2:1 | R2:1 | D2:2 | R2:2 |
|---|---|---|---|---|---|
| Berkeley | Berkeley | Alameda County | Alameda County | California | California |
| Oakland | Oakland | Alameda County | Alameda County | California | California |
| Palo Alto | Palo Alto | Santa Clara County | Santa Clara County | California | California |
| San Jose | San Jose | Santa Clara County | Santa Clara County | California | California |

New 2nd Dimension Table: After Step 1 — 703

| D2:0 | R2:0 | D2:1 | R2:1 | D2:2 | R2:2 |
|---|---|---|---|---|---|
| Berkeley | Alameda County | Alameda County | Alameda County | California | California |
| Oakland | Alameda County | Alameda County | Alameda County | California | California |
| Palo Alto | Palo Alto | Santa Clara County | Santa Clara County | California | California |
| San Jose | San Jose | Santa Clara County | Santa Clara County | California | California |

Secure 2nd Dimension Table: After Rewriting — 704

| D2:0 Reference to Fact Table | R2:0: Level – 0 "City" or "County" | D2:1: Level – 1 "County" | D2:2 "State" |
|---|---|---|---|
| Berkeley | Alameda County | Alameda County | California |
| Oakland | Alameda County | Alameda County | California |
| Palo Alto | Palo Alto | Santa Clara County | California |
| San Jose | San Jose | Santa Clara County | California |

FIG. 8
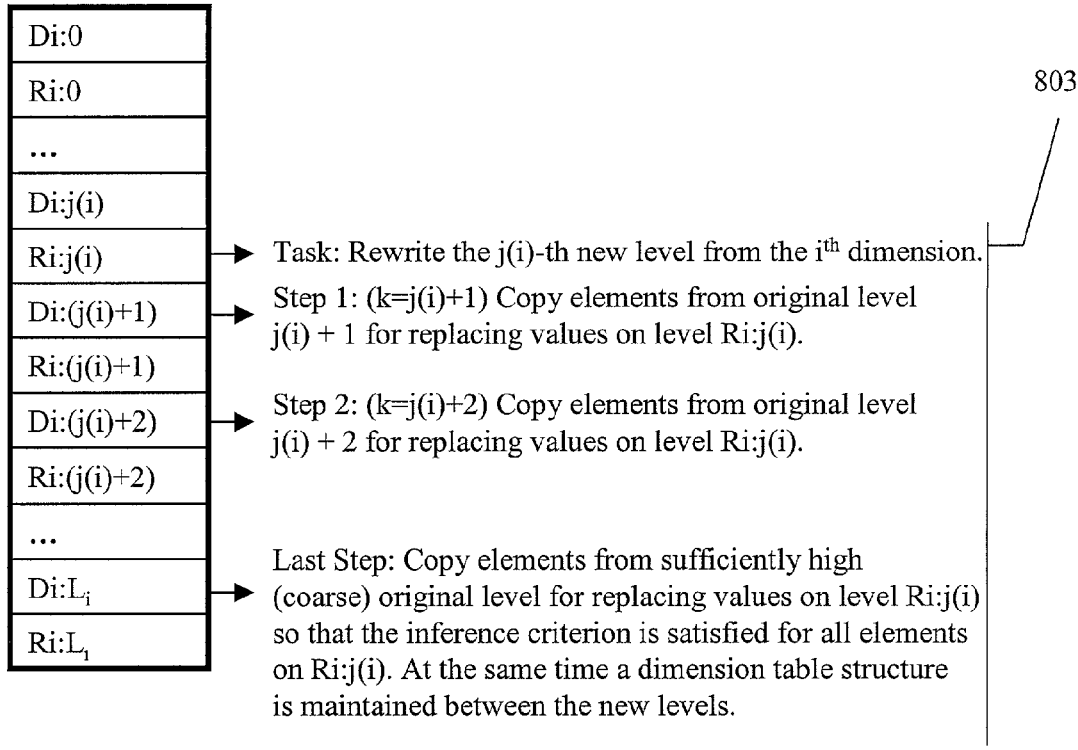
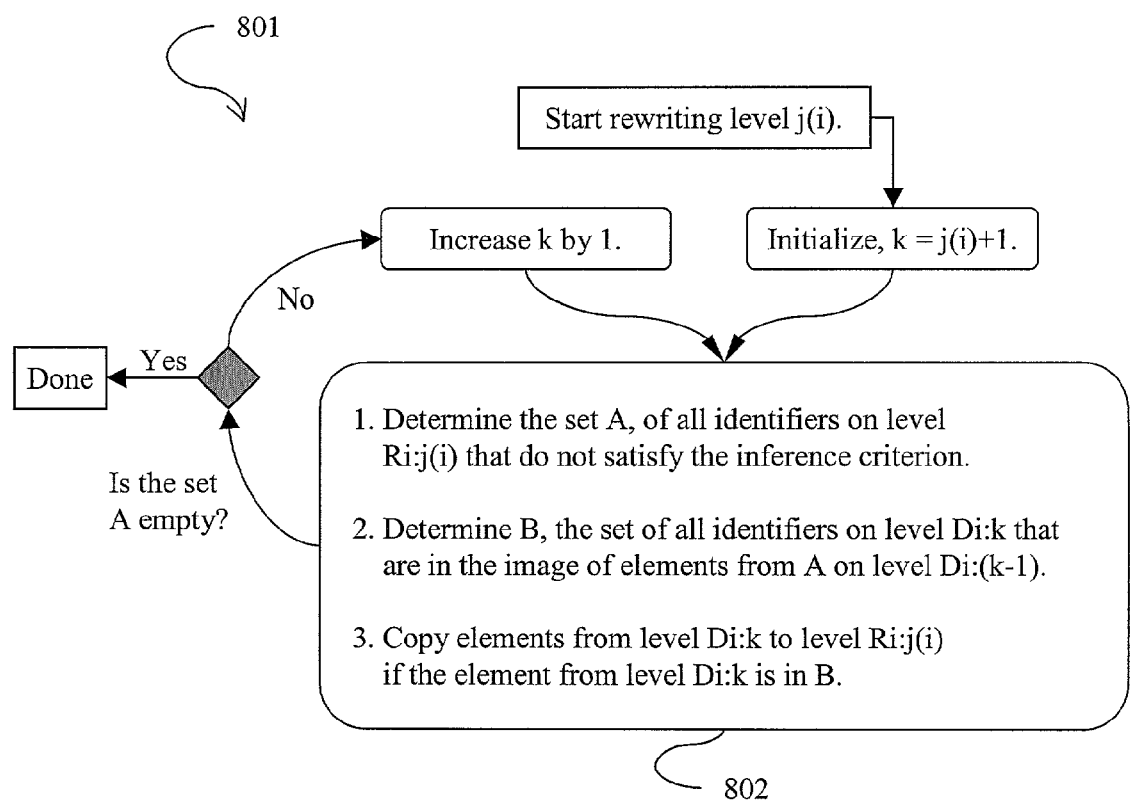

INFERENCE CONTROL METHOD IN A DATA CUBE

BACKGROUND OF THE INVENTION

1. Field of the Invention

This invention relates to a method and apparatus for providing inference control and discovering patterns in tabular data in a database and, more particularly, to a method and apparatus for modifying a hypercube so that it satisfies complex criteria.

2. Description of the Related Art

Producing statistical data that is safe to be released to external researchers is a subject for statistical inference control. Methods exist to modify data in such a way that safe data emerges. The text "Elements of Statistical Disclosure" (Willenborg, L. C. and T. DeWaal, Lecture Notes in Statistics 155, Springer Verlag, September 2000) describes methods that may be used to modify data with near minimum information loss.

Information content in tabular data is measured in various ways. Commonly such measurements are "entropy" based, constructed by taking advantage of the theory developed by Claude E. Shannon in 1948 and originally published in the Bell System Technical Journal, vol. 27 and then in modified form by Weaver and Shannon in "The Mathematical Theory of Communication" from 1949 (see Shannon, C. E., "A mathematical theory of communication," *Bell System Technical Journal*, 27(379–423 and 623–656, July and October, 1948 and Weaver, W. and C. E. Shannon, "The Mathematical Theory of Communication," Urbana, Ill.: University of Illinois Press, 1949, republished 1963). Another useful reference and introduction to information theory is the book "Mathematical Foundations of Information Theory" by A. I. Khinchin (see Khinchin, A. I., "Mathematical Foundations of Information Theory," Dover Publications, New York, N.Y., 1957).

The disclosure describes methods that may be implemented in an SQL database system. It uses SQL program statements to describe processes in details. The ANSI documents, X3.135-1992, "Database Language SQL" and ANSI/ISO/EIS 9075, defining the SQL standard are available from the American National Standards Institute. Furthermore, the textbook "Database Management Systems" by Ramakrishnan and Gehrke, teaches many useful databases techniques that are applicable to the disclosure (see Ramakrishnan, R. and J. Gehrke, "Database Management Systems," Second Ed., McGraw Hill, 1999).

The methods disclosed herein are applied to hypercube realizations such as star schemas in data warehouses. Data warehousing techniques and star schemas are discussed and explained in the "Data Warehousing Guide" from Oracle Corporation (see "Data Warehousing Guide" (Part No. A90237-01), June 2001, Oracle Corporation—www.oracle.com.) and in the book "Object-Oriented Data Warehouse Design: Building A Star Schema" by William A. Giovinazzo ("Object-Oriented Data Warehouse Design: Building a Star Scheme," Prentice Hall, February 2000).

U.S. Pat. No. 6,275,824 discloses methods for enforcing and storing privacy constraints or parameters along with data tables in a database or a data warehouse.

SUMMARY OF THE INVENTION

Increasingly, governments and other ruling bodies are placing requirements on researchers requiring protection of information about individuals, such as medical, genealogy and genetics records. Among the requirements, includes protecting individual identities from being inferred from other attributes in aggregated datasets, released to or viewed by researchers. This may include requiring a minimum number of individuals to be represented by each dataset that can be formed by the basic set operations for a given aggregation. The present invention discloses processes and algorithms that may be used to modify hypercube realizations, e.g., star schemas, in such a way that the modified schemas satisfy the identity protection (privacy) requirements. This is achieved without modifying the underlying dataset at all, only the attributes used to determine how the data is aggregated and viewed, called dimension attributes, are rearranged. The same processes may also be used to enforce rewriting of the hierarchies associated with the hypercube in such a way that the modified structures reveal correlations and patterns in the dataset.

It is therefore an object of the present invention to provide a system for efficiently editing dimension structures in a hypercube in such a way that complex user or system specified criteria are satisfied by the modified hypercube or its projections.

A hypercube containing a large number of dimensions, levels and hierarchical structures can be a very complex object. Efficiently navigating a researcher or an analyst through its dimension structure can be a nontrivial task. The same is true for guiding data mining and rewriting algorithms through the hypercube. The current invention discloses methods for defining paths that may be used to travel between the different levels of a data cube in such a way that the various structures existing in the cube are brought to light.

It is therefore another object of the present invention to provide a system for efficiently navigating users and processes through the dimension model presented by a hypercube implementation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 illustrates the evolution of a dimension table before, during and after a rewriting process.

FIG. 6 contains an example of a refinement path and tables from a star schema.

FIG. 7 exemplifies the evolution of a dimension table before, during and after a rewriting process.

FIG. 8 illustrates an algorithm (computer procedure) used to rewrite a level from a dimension table or from another dimension realization.

DETAILED DESCRIPTION OF THE INVENTION

The following description of the preferred embodiment is to be understood as only one of many possible embodiments allowed by the scope of the present invention. Reference is made to the accompanying figures, which form a part hereof.

Hardware

Figure 1:
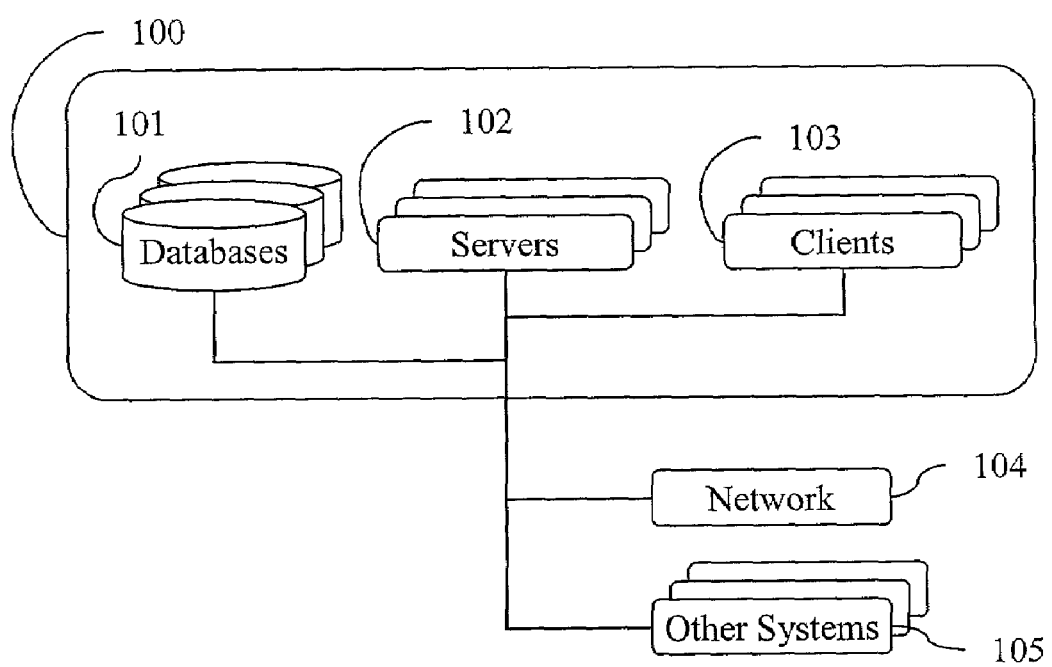
FIG. 1 is a block diagram illustrating an exemplary hardware setup for implementing the preferred embodiment of the present invention.

FIG. 1 is a block diagram illustrating an exemplary hardware setup used to implement the preferred embodiment of the present invention. Client/server architecture is illustrated comprising database server(s) 101, application server(s) 102 and client(s) 103. In the exemplary setup shown, the hardware may include, inter alia, a processor, memory, keyboard, pointing device, display and a data storage device. The computers may be networked together through a networking architecture 104 that may be a local network connecting the hardware 101, 102 and 103 or be part of a larger system, i.e., including other systems 105. The client(s) 103, the database server(s) 101 and server(s) 102 may all or some be located on remote networks connected together by a complex network architecture 104. The present invention may be implemented combining some or all of the systems on a single computer.

Typically, the present invention is implemented using one or more computers that operate under control from operating systems such as Windows or UNIX type systems, etc. The operating systems enable the computers to perform the required functions as described herein. The database server(s) 101 may support complex relational or multidimensional database designs or both but also a simpler system of flat files will suffice. The methods described in the present invention may be implemented in the form of executable program code and data, in various formats. The program/machine code and data may be stored in the different systems shown in 100 both in memory and on storage devices. This may include low-level machine-readable code, high-level SQL statements, code executable in the database system and other program code executable within the various systems or subsystems in 100. The code may be generated using various programming environments, including many C++, Java or C# based languages, and the various languages specifically designed for accessing databases. The present invention may thus be considered a software article, which may be distributed and accessed using the various media or communication devices compatible with the operating systems used.

Hypercube Realizations

Hypercubes are structures, also referred to as data cubes, multidimensional cubes or just cubes, that are commonly defined in databases. These structures are often at the center of a data warehouse or a data mart. One way to realize a hypercube is to follow a star schema approach. The star schema approach is becoming a standard for representing hypercubes. Several other factors make the star schema dimension model attractive, including the ongoing effort to optimize queries in relational SQL databases issued against star schemas. See for example, chapter 17: "Schema Modeling Techniques" in the Oracle 9i "Data Warehousing Guide" (Part Number A90237-01) available from Oracle Corporation. Another dimension modeling technique is the snowflake schema in which the "dimension tables" are normalized. There are also several different multidimensional databases that efficiently use matrix-type structures to model hypercubes. The disclosure, herein is in no way limited to a given hypercube realization. For clarity, many of the methods will be demonstrated using a star schema setup.

Figure 2:
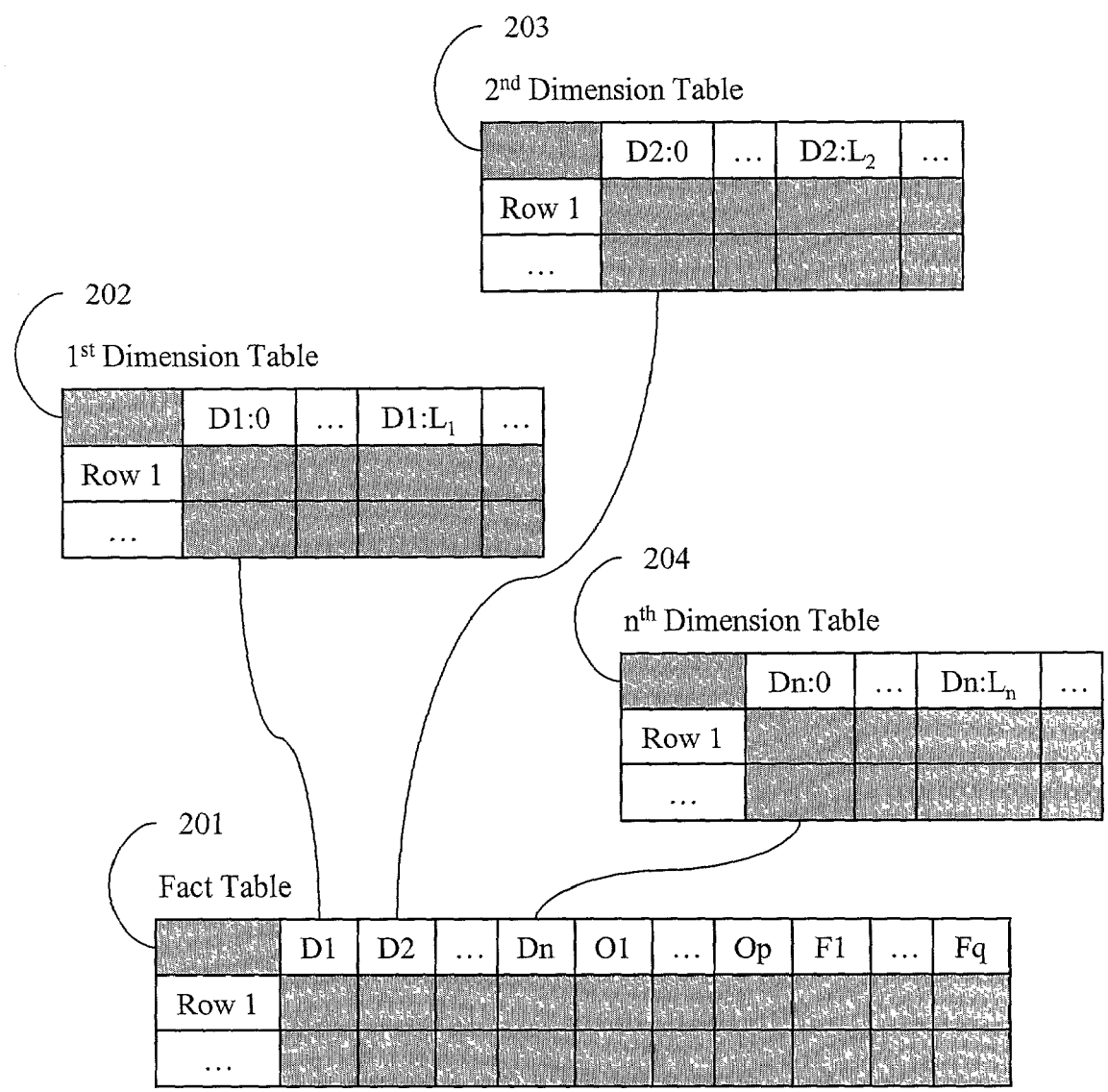
FIG. 2 shows a star schema setup.

FIG. 2 shows a star schema setup. The basic parts of a star schema in a relational SQL database include the fact table 201 and its dimension tables 202, 203 and 204. The fact table has columns, denoted here by D1, D2, ..., Dn, containing identifiers referencing identifiers from the finest granularity levels, denoted D1:0, D2:0, ..., Dn:0, respectively, of the dimension tables 202, 203, 204. In other words, the fact table 201 and the dimension tables 202, 203, 204 are joined through these columns. Each dimension table 202, 203, 204 models one or more hierarchical structure. The hierarchical mapping from one level to another in a given hierarchy is obtained by moving horizontally, i.e., within the same row between (across) columns in its dimension table. In the disclosure at hand, Applicants associate one or more hierarchical structure to each dimension table 202, 203, 204 and select one of the hierarchies from each dimension for rewriting at the time. The levels for the hierarchy selected from dimension table 202 are ordered D1:0, D1:1 to D1:$L_1$ from finest to coarsest. For dimension table 203 the levels are ordered D2:0, D2:1 to D2:$L_2$ again from finest to coarsest, and similarly for the other dimension tables. Each of the fact—or dimension tables 201, 202, 203, 204, may have one or more additional columns containing the various implementation specific attributes or identifiers as indicated in FIG. 2 by columns O1, ..., Op, F1, ... Fq.

Refinement Paths

Throughout the disclosure, references will be made to so-called refinement paths. Refinement paths can be thought of as an ordered sequence of m+1 vectors $v_0, \ldots, v_m$. Each of the vectors $v_q$ contains n entries $(j_1(q), \ldots, j_n(q))$ where the $p^{th}$ entry $j_p(q)$ is a level index from the $p^{th}$ dimension in a given star schema. Using the notation from FIG. 2 the $p^{th}$ entry $j_p(q)$ represents level column $Dp:j_p(q)$ from the $p^{th}$ dimension in the star schema. Accordingly, $j_p(q)$ is one of the integers $0, \ldots, L_p$ and the point $v_q$ in the path represents columns $D1:j_1(q), D2:j_2(q), \ldots, Dn:j_n(q)$ from dimension tables D1, D2, ..., Dn, respectively. A refinement path is required to be decreasing in such a way that the vectors $v_{q-1}$ and $v_q$ have the same entries in all slots, except for one slot, say the $i^{th}$ one, in which the values decrease by one, i.e., $j_i(q)=j_i(q-1)-1$. Applicants denote this slot, or selected dimension, by $r_q=i$. It further may be required, that $v_m$ is the "origin" representing the finest levels in all the selected hierarchies, i.e., $v_m=(0, \ldots, 0)$. Instead of referring to the refinement path the same information is contained in the list of selected dimensions described above, i.e., the list $r_1, \ldots, r_m$.

Figure 3:
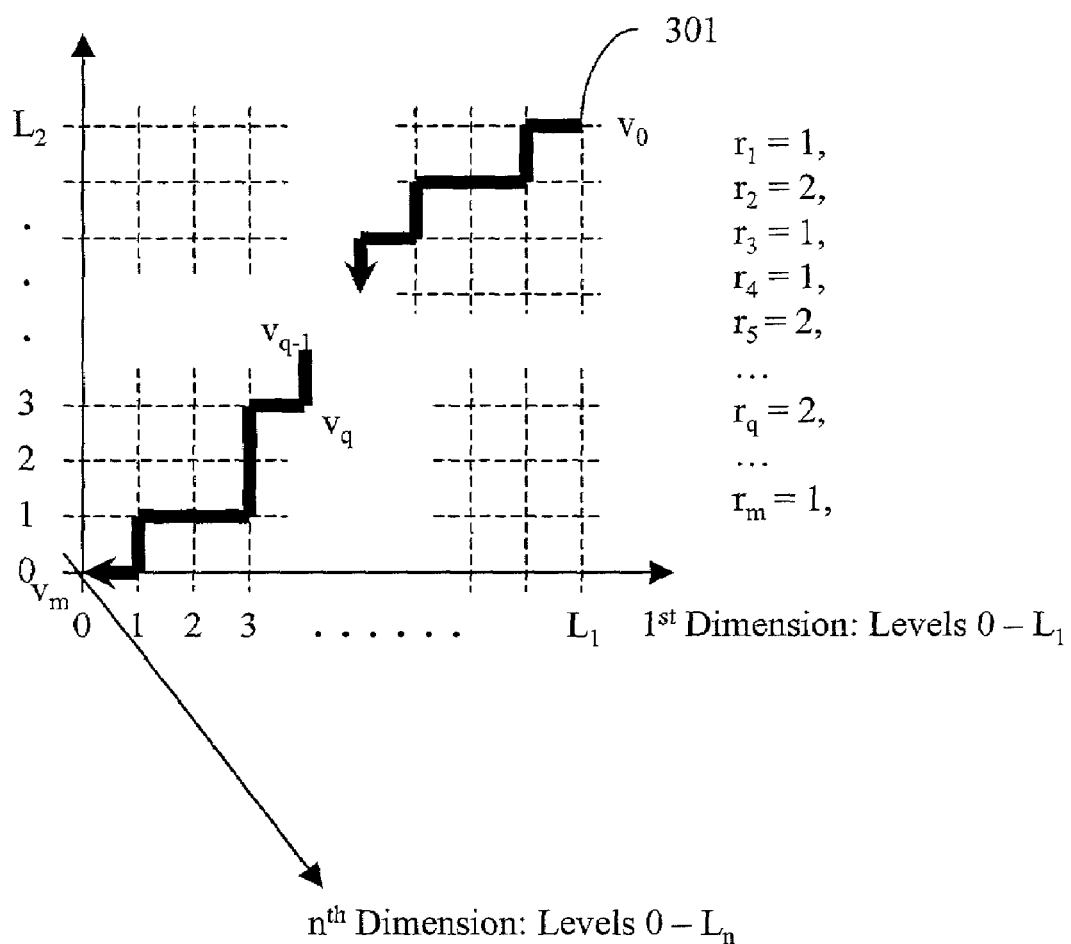
FIG. 3 illustrates and exemplifies a path, in the space of levels associated with the various dimensions, called a refinement path here.

FIG. 3 shows a refinement path $v_0, \ldots, v_m$ and its corresponding list of selected dimensions $r_1, \ldots, r_m$. The exemplified path 301 is constructed in such a way that $v_0=(L_1, L_2, 0, \ldots)$, $v_1=(L_1-1, L_2, 0, \ldots)$, $v_2=(L_1-1, L_2-1, 0, \ldots)$ and so on. Consequently $r_1=1$, $r_2=2$ and so on. The starting point of a refinement path $v_0$ can be any point in the graph.

Given a star schema, indexed according to FIG. 2, there are many different ways to select a refinement path. The path may be generated in reverse order, i.e., starting from the origin. Below is a list of few possible methods.
1. The path may be specified by the end-user of the system through a (graphical) user interface.
2. The path may be determined by the system in such a way that the path approximates, as much as possible, a straight line from $(L_1, \ldots, L_n)$ to $(0, \ldots, 0)$.
3. The path may be determined by following, reversely, a path, starting at the origin, that keeps the information content or other entropy based values associated with the star schema at a maximum (or minimum).
4. The path may be determined by following, reversely, a path, starting at the origin, that searches for structural patterns associated with the star schema.

There are many possible methods for associating probabilities with attributes from the dimension tables 202, 203, 204. For example, given attributes $(a_1, \ldots, a_n)$ from levels $j(1), \ldots, j(n)$ in dimension tables $D1, \ldots, Dn$, respectively, one can count the number of elements in the fact table 201 that map to the attributes $(a_1, \ldots, a_n)$ using the join explained in connection with FIG. 2. Referring to FIG. 2, an SQL statement giving this count, $Count(a_1, \ldots, a_n)$, is modeled by "$Count(a_1, \ldots, a_n)$=select count(*) from
<Fact Table>FactTable,
<1st Dimension Table>DimTable_1,
...,
<$n^{th}$ Dimension Table>DimTable_n where
FactTable.<D1>=DimTable_1.<D1:0> and
... and
FactTable.<Dn>=DimTable_n.<Dn:0> and
DimTable.<D1:j(1)>=$a_1$ and
... and
DimTable.<Dn:j(n)>=$a_n$"

The associated probability $p(a_1, \ldots, a_n)$ may then be defined as the ratio $Count(a_1, \ldots, a_n)$ divided by the total number of elements in the fact table 201. Other possible methods include using a fact or measure column in the fact table 201 and other aggregate operators, e.g., SUM, to assign probability measures to the dimension attributes $(a_1, \ldots, a_n)$. Having a probability function allows one to calculate the entropy, $H(j(1), \ldots, j(n))$ associated with the levels $j(1), \ldots, j(n)$ from the hierarchical structure associated with dimension tables $D1, \ldots, Dn$. The entropy is obtained by summing over all values of the form:

$p(a_1, \ldots, a_n) \log (1/p(a_1, \ldots, a_n))$, for all the possible contributing attributes $a_1, \ldots, a_n$ on levels $j(1), \ldots, j(n)$ from dimension tables 1 to n, respectively. For further references on entropy see, for example, the book "Mathematical Foundations of Information Theory" by A. I. Khinchin, (Dover Publications, Inc., 1957) or the other texts referred to earlier.

Having an entropy function associated with any collection of levels, as demonstrated, allows one to associate with the refinement path different kinds of entropy-based functions. These include functions that reveal how much information or structure is being lost or added in each step. The path may therefore be constructed, e.g., in reverse order, with respect to any such measure, for example to maximize or minimize the function in each step.

In order to explain this further, assume that the last point in the refinement path is the origin $(0, \ldots, 0)$. Since the last point is fixed one can define the path recursively (backwards). When a point $(j(1), \ldots, j(n))$ has been determined, the preceding point may be obtained by increasing the level $j(i)$ by one, in the $i^{th}$ slot, associated with the $i^{th}$ dimension by picking the $i^{th}$ dimension resulting in the highest value of a determining function $Y_i(j(1), \ldots, j(n))$. In each step, only values that define levels associated with the dimensions should be considered, i.e., if $j(t)$ is already equal to the maximum level $L_t$ then i=t should not be considered.

As explained above $Y_i$ may be based on calculating the entropy for the various spaces. One such intensity function is given by "$Y_i(j(1), \ldots, j(n))=1-H(j(1), \ldots, j(i-1), j(i)+1, j(i+1), \ldots, j(n))/(A_i(j(i)+1)+B_i(j(1), \ldots, j(i-1), j(i=1), \ldots, j(n)))$"

where $H(j(1), \ldots, j(i-1), j(i)+1, j(i+1), \ldots, j(n))$ is the entropy associated with levels $j(1), \ldots, j(i-1), j(i)+1, j(i+1), \ldots, j(n)$ (i.e., the candidate point), $A_i(j(i)+1)$ is the entropy associated with projecting the schema onto the $j(i)+1$ level of the $i^{th}$ dimension (i.e., ignoring all other dimensions) and $B_i(j(1), \ldots, j(i-1), j(i+1), \ldots, j(n))$ is the entropy associated with projecting the cube onto all the other dimension levels $j(1), \ldots, j(i-1), j(i+1), \ldots, j(n)$ except the $i^{th}$ dimension (i.e., ignoring the $i^{th}$ dimension).

Using this function for determining intensity in attempts to construct a path through the levels, reveals multidimensional structures or patterns, i.e., correlations, in the data in each step. It also enables the rewriting process disclosed below to avoid invalidating correlations that may exist in the hypercube being modeled, or depending on the refinement path constructed, it may be used to extract relationships expressed in the hypercube. Different and possibly more complicated determining functions can be constructed by considering sequences of preceding points in each step, instead of just one at the time.

Rewriting of Dimension Tables

The processes disclosed herein may require modifying or replacing the dimension tables 202, 203, 204 with new tables. One possible setup for the rewriting process is to start with dimension tables that contain two identical copies of each level column. One for reference and the other one for editing. This setup may be used in order to take advantages of methods developed for optimizing star queries, but multiple other setups are possible. Other setups include using a snowflake schema. After the editing of all levels is completed the redundant original levels may be removed in some cases. It may be considered beneficial not to modify the fact table 201 in a star schema since it may contain observations, such as medical information about individuals, or results from measurements and often these should not be modified. In other words, only the dimension tables 202, 203, 204 are modified.

The processes now disclosed describe how the hierarchical structure associated with a dimension, and modeled in a given dimension table or other realizations, is modified by moving identifiers between levels of the hierarchy. This could result in the link, i.e., the entity relationship between the fact table 201 and the dimension tables 202, 203, 204 becoming invalid. In order to avoid this, the finest level is not modified or removed. This results in the possibility that, after the rewriting, the hierarchy may have one additional level, namely both the original—and the modified version of the finest granularity level (e.g., see FIG. 4, FIG. 5, FIG. 6 and FIG. 7, in particular the transition from dimension table 701 to 704). In this case, depending on the purpose of the rewriting, the original finest level may have to be hidden in such a way that users cannot select attributes from that level directly for defining aggregation levels or viewing results based on the attributes. The purpose of maintaining the original finest granularity levels unchanged in the dimension tables 202, 203, 204 is to keep the entity relationship defining the star schema intact.

On the other hand, if the system cannot guarantee that the fact table 201 or the original finest level will be kept hidden, then the star schema, including the fact table 201, may need to be rewritten and replaced with an aggregated fact table and dimension tables containing only modified levels. This could, for example, be the case when a star schema is being exported to other systems or is being published.

FIG. 4 illustrates the evolution of a dimension table before, during and after a rewriting process. A dimension table, identified as the $i^{th}$ dimension table in a star schema, is shown as 401. The hierarchical structure associated with the dimension table 401 has level columns shown as Di:0, . . . ,Di:$L_j$ from finest to coarsest. The dimension table 401 may have other columns defining other hierarchical structures and various other attributes.

Table 402 shows a modified version of table 401 after each of the level columns has been repeated. For clarity, and throughout the disclosure, Applicants identify these new columns by Ri:0, . . . ,Ri:$L_j$. The new columns initially contain a copy of columns Di:0 , . . . ,Di:$L_1$, respectively. After the columns Ri:0 , . . . ,Ri:$L_i$ have been modified and the process is complete, then a cleanup process may be used to remove some of the original level columns, if they are no longer needed.

Table 403 shows the table after the cleanup process has been applied. As shown, the original finest level column may need to be left unchanged in order not to invalidate the relationship between the dimension table and the fact table. The new rewritten hierarchy therefore, in some cases, contains one more level than it initially did, i.e., the levels for the rewritten hierarchy are Di:0->(read "maps to") Ri:0->Ri:1-> , , , ->Ri:($L_i$-1)->Di:$L_i$. As indicated the coarsest level (Di:$L_i$) is usually not modified since most of the processes disclosed move identifiers from coarser to finer levels only.

The user or developer of a system implementing the processes have several other equivalent choices in removing or keeping levels after the rewriting processes are completed. For example, if a level Ri:j is not changed then the original level Di:j may be continued to be used instead of the new column Ri:j. Furthermore, some star schema implementations require both identifiers and descriptive attributes to be stored together in a dimension table. For the person skilled in the art, it is a simple task to apply the processes described to these settings also and to other variations.

Modified Hypercube Realizations

As indicated earlier, the processes disclosed herein are used to modify hypercube realizations, such as star schemas. The reasons for such modifications may vary. One motivation for modifying dimension tables 202, 203, 204 is to implement inference control, including implementing requirements ensuring conformance with government laws requiring protection of information about individuals, such as medical, genealogy or genetics records. Another motivation for rewriting dimension tables 202, 203, 204 and using refinement paths 301 to navigate processes in the dimension model, includes discovering patterns or hidden structures found in the fact table 201. The rewriting may be used to process the model in such a way that patterns and structures may be extracted and visualized in a multidimensional analysis tool. In other words, the rewriting processes may be used to implement data mining algorithms. As explained in greater detail below, the refinement paths 301 may be used to guide the rewriting of dimension tables 202, 203, 204.

This is done in such a way that desired properties, such as the hiding of identities of individuals by way of aggregation for example, will also apply to lower levels in the hierarchy. Accordingly, the rewritten dimension tables are sometimes referred to as being secure or just modified.

Figure 5:
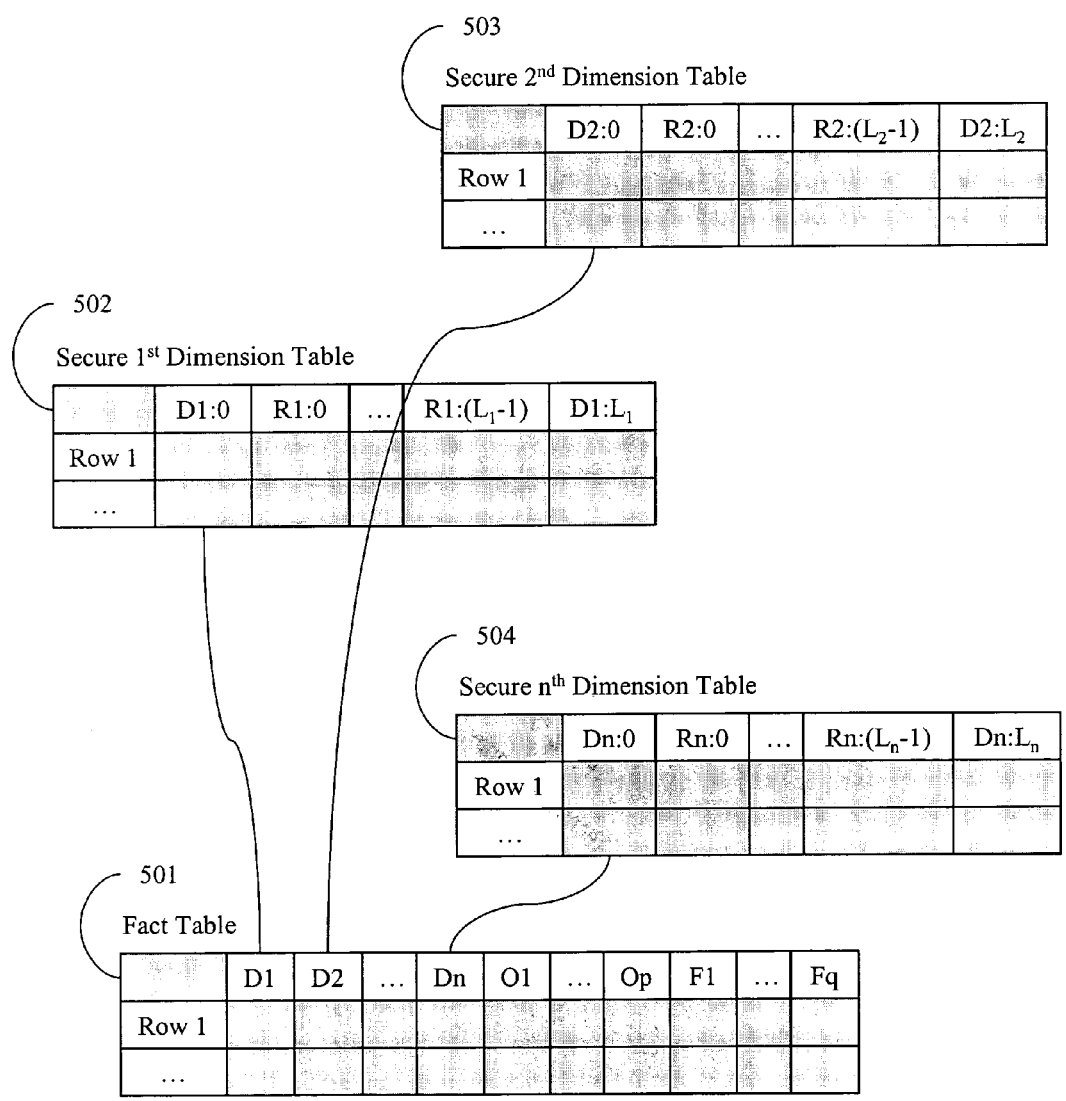
FIG. 5 illustrates a star schema after the dimension tables have been modified or rewritten.

FIG. 5 shows the star schema setup from FIG. 2 after its dimension tables have been modified or rewritten. The fact table 501 need not be modified and contains its original columns intact. The modified dimension tables 502, 503 and 504 contain the modified levels, indexed by Ri:j as well as possibly the original finest granularity levels, indexed by Di:0. As indicated, the entity relationship between the fact and dimension tables 501, 502, 503, 504 is maintained by including the levels Di:0 in the modified dimension tables.

EXAMPLES

FIGS. 6 and 7 exemplify the rewriting of dimension tables 202, 203, 204. Path 601 is a refinement path in a space determined by two hierarchical structures associated with two dimensions and having 2 and 3 levels, respectively. The path 601 shown is specified, using the notation introduced in connection with FIG. 3, by the two points $v_0$=(0,1) and $v_1$=(0,0). The list of selected dimensions is $r_1$=2 which identifies the location dimension only. Table 602 summarizes a small fact table, named "Infections_Study", with columns identified by the names "ID", "Gender" and "City" and having 79 rows for example. The two columns or edges of the cube, named "Gender" and "City" reference values from the finest levels of hierarchies called "Gender" and "Location" which are realized by dimension tables 603 and 604, respectively. Dimension table 603 has two level columns "Gender" and "All", dimension table 604 has three level columns "City", "County" and "State". The columns shown from table 603 correspond to columns identified earlier by D1:0 and D1:1 respectively, and the columns shown from table 604 correspond to columns identified by D2:0, D2:1 and D2:2, respectively.

The criterion used to rewrite the levels may be entered or selected by the user of the system. In this example, it is assumed that the criterion used is the following requirement written as an SQL conditional expression: count(distinct ID)>5. In other words, only attributes $a_1$ and $a_2$ from dimensions 1 and 2 respectively are acceptable if the attributes are held by at least 5 different ID's. From the figures presented, it is immediate (from summary table 602) that all combinations of attributes from the two dimension tables 603, 604 are acceptable, except the attribute pair "City"="Berkeley" and "Gender"="Male" which only determine 2 ID's.

In particular, combinations of attributes from the levels determined by the starting point $v_0$=(0,1), representing the levels "Gender" and "County", of the refinement path always satisfy the criterion used. Since the criterion used is satisfied at the level combination determined by the point $v_0$ then, according to the present invention, one may modify the levels determined by the succeeding point v1=(0,0) in such a way that the modified levels satisfy the criterion also. This is achieved by replacing some of the elements from the selected dimension r1=2 ("location") with elements from higher "location" levels.

FIG. 7 shows the $2^{nd}$ dimension "location" before the rewriting starts as 701. The dimension table 701 is then modified or a new table 702 created which has each, or at least some, of the levels repeated as indicated by 702 in FIG. 7. The levels are indexed, for simplicity here, according to the indexing schema suggested in connection with FIG. 4. The rewriting required, ensuring that the modified level combination $v_1$ inherits the property of satisfying the criterion above, i.e., count(distinct ID)>5 attribute-wise, may be specified by the SQL update statement:

update <The new 2nd dimension table-702>
set<New Level Column R2:0>=<Original Level Column D2:1>
where <Original Level Column D2:1>
IN (select distinct <Original Level Column D2:1>
  from <The new 2nd dimension table-702>
  where <Original Level Column D2:0>
  IN (select distinct <New Level Column R2:0>
    from <The Horizontal-Structure-View>
    group by <R1:0>, <R2:0>
    having not (count(distinct ID)>5)
    )
)

The above SQL table UPDATE statement, is explained in greater detail in connection with FIG. 8 below. In particular, it is explained that the variable identified as <The Horizontal-Structure-View> above is a subquery, or view, that contains the columns from the fact table and all the level columns from the new dimension tables joined according to the given star schema. In the case at hand, the query or view may be defined by the SELECT statement:

select FactTable.*, NewDimTable__1.*, NewDimTable__2.* from
  Infections_Study FactTable,
  <The new 1st dimension table>NewDimTable__1,
  <The new 2nd dimension table>NewDimTable__2
  where
  FactTable."Gender"=NewDimTable__1.<D1:0> and
  FactTable."City"=NewDimTable__2.<D2:0>

Both of the above SQL statements can be written in many different equivalent forms. After the editing of table 702 shown above, the table should contain rows as shown by table 703. It only differs from 702 in the column denoted by R2:0, which now contains entries also from the coarser levels. Since $v_1$ is the endpoint of the refinement path no more rewriting is required and the unnecessary level columns may be removed. This cleanup may result in a dimension table similar to 704. In this example, the rewritten level has been renamed and is called "City or County", indicating that it contains entries from more than one of the original levels. Table 704 is a valid dimension table and the level mappings D2:0->(read "maps to") R2:0->D2:1->D2:2 always map elements to elements of coarser or equal granularity as required. The level indexed by D2:0 may be made inaccessible to the end-user; its purpose is to maintain the entity relationship with the fact table intact. It is now a straightforward task to verify that any combination of attributes from the 1st dimension table 603, on the one hand, and from the end-user accessible levels (R2:0, D2:1, D2:2) from the secure 2nd dimension table 704, on the other hand, are held by at least 5 different ID's as specified by the criterion used.

Rewriting Algorithms: Rewriting One Level

It is assumed that the user of the system specifies a criterion or that the system determines it from other sources. In any case, it is assumed that the criterion can be applied to the sets obtained by fixing attributes from the dimensions in the hypercube.

When working with star schemas in an SQL database this may be realized as follows: First define a view (or just a query) that contains the columns from the fact table 201 and all the columns from the new dimension tables 402 or 403 joined together according to the given star schema model. The view therefore has columns indexed by (using the notation from FIG. 4 and FIG. 2) D1, . . . , Dn, O1 , . . . , Op, F1, . . . , Fq, D1:0, R1:0, . . . , Dn:$L_n$ Rn:$L_n$ assuming that the new or modified dimension tables are in the state described by 402 from FIG. 4. Depending on the implementation it may be possible to reduce the number of columns or in some cases add other columns from the dimension tables. This view or query will be called the Horizontal-Structure-View for the given hypercube realized by the star schema.

An SQL statement creating the view may, in many cases, be implemented as follows:
Create view <Horizontal-Structure-View> as
  select FactTable.*,
    NewDimTable__1.*,
    NewDimTable__2.*,
    . . . ,
    NewDimTable_n.* from
  <Fact Table>FactTable,
  <The new 1st dimension table>NewDimTable__1,
  <The new 2nd dimension table>NewDimTable__2,
  . . . ,
  <The new $n^{th}$ dimension table>NewDimTable_n where
  FactTable.<D1>=NewDimTable__1.<D1:0> and
  FactTable.<D2>=NewDimTable__2.<D2:0> and
  . . . and
  FactTable.<Dn>=NewDimTable_n.<Dn:0>

This statement is valid if the columns in the tables all have different names, if that is not the case then the statement may be altered in a simple way. On the other hand, the invention system can easily inform the user of what naming conventions are required or simply just rename all the columns in the view so that no conflicts occur.

Now back to the criterion, also called inference criterion here. The criterion may be realized as a valid SQL conditional string, denoted herein by Specified-Inference-Criterion. The string needs to be applicable to the star schema model as a column function, i.e., as a conditional column function applied to any set of rows from the Horizontal-Structure-View. An example of such a function is: count(*) >9, implying that a set of dimensional attributes is only acceptable if it defines at least 10 rows in the fact table. Now, for a given criterion and a refinement path $(v_0, v_1, \ldots, v_m)$ assume that for any combination of identifiers $a_1, \ldots, a_n$ from the new, possibly modified, levels pointed to by $v_q$, respectively, the given criterion is satisfied. In this case Applicants say that the criterion is satisfied by the point or levels $v_q$ in the refinement path. Specifically, if $v_q=(j(1), \ldots, j(n))$ then this is equivalent to the SQL statement:

select <R1:j(1)>, . . . ,<Rn:j(n)> from <The Horizontal-Structure-View>
  group by <R1:j(1)>, . . . ,<Rn:j(n)>
  having not (<Specified-Inference-Criterion>)

which returns no rows. For many applications it is important to require that the criterion be such that if the conditional column function is true for a set of rows C then it remains true for any set of rows that contains C as a subset. If this is the case then the criterion will be referred to as being normal.

FIG. 8 contains a flow chart illustrating how one of the new levels pointed to by $v_q$ may be edited in such a way that the specified criterion will be satisfied by the point $v_q$ in the refinement path. This is, assuming that the specified criterion is normal and is already satisfied by the preceding point $v_{q-1}$ in the refinement path. It is always assumed that the new levels Ri:j only contain elements from the original levels Di:j, Di:(j+1), ..., Di:$L_j$, i.e., no elements from the finer levels. For the purpose of indexing our objects it is assumed that the current point in the refinement path is $v_q$=(j(1), ... ,j(n)) and the selected dimension is i=$r_q$, referring to the notation introduced earlier.

According to the algorithm (procedure) 801 presented in FIG. 8, the j(i)-th new level, Ri:j(i) is edited at 803. As explained earlier the level Ri:j(i) starts out as a copy of the original level Di:j(i). The process may start by initializing a variable k pointing to a level above the j(i)-th level, i.e., k=j(i)+1. Then the following steps are executed at 802 in FIG. 8:

1. The invention system determines the set A, of all identifiers on level Ri:j(i) that do not satisfy the inference criterion, i.e., they define rejected sets of rows. The set A may be determined by the SQL statement:
    select distinct <Ri:j(i)> from <The Horizontal-Structure-View> group by
    <R1:j(1)>, ... ,<Rn:j(n)> having not (<Specified-Inference-Criterion>).
2. Determine the set B, of all identifiers on level Di:k that are in the image of elements from the set A on level Di:(k−1) under the hierarchical mapping selected. The set B may be determined by the SQL statement:
    select distinct <Di:k> from <The new $i^{th}$ dimension table> where
    <Di:(k−1)>IN (<A>).
3. Copy elements from level Di:k to level Ri:j(i) if the element from level Di:k is in B. The set of rows being edited is such that the structure of the new columns determines a hierarchical structure, i.e., for example, the same element on level Ri:j(i) is not related to more than one element on a coarser level. This operation may be executed by the following SQL statement:
    update <The new $i^{th}$ dimension table> set <Ri:j(i)>=<Di:k> where
    <Di:k>IN (<B>).

These 3 steps may be executed against an SQL database using the single SQL statement:
    update <The new $i^{th}$ dimension table>
    set <New Level Column Ri:j(i)>=<Original Level Column Di:k>
    where <Original Level Column Di:k>
    IN (select distinct <Original Level Column Di:k>
        from <The new $i^{th}$ dimension table>
        where <Original Level Column Di:(k−1)>
        IN (select distinct <New Level Column Ri:j(i)>
            from <The Horizontal-Structure-View>
            group by <A List of New Level Columns R1:j(1), ..., Rn:j(n)>
            having not (<Specified-Inference-Criterion>)
        )
    )

If no updates occur, or k=$L_i$ already, then the process may be terminated, otherwise k is increased by one and the above SQL statement is issued again, with a new value for k. Since the specified criterion is normal and satisfied by the point $v_{q-1}$ then it will also be satisfied by the point $v_q$ after the process has terminated.

Illustration 803 show the steps in the editing of the new level Ri:j(i) as k increases. Flowchart 801 shows the above algorithm and in particular, process 802 shows the part that is achieved by executing the above SQL update statement.

Rewriting Algorithms: Rewriting Multiple Levels from Several Dimensions

Figure 9:
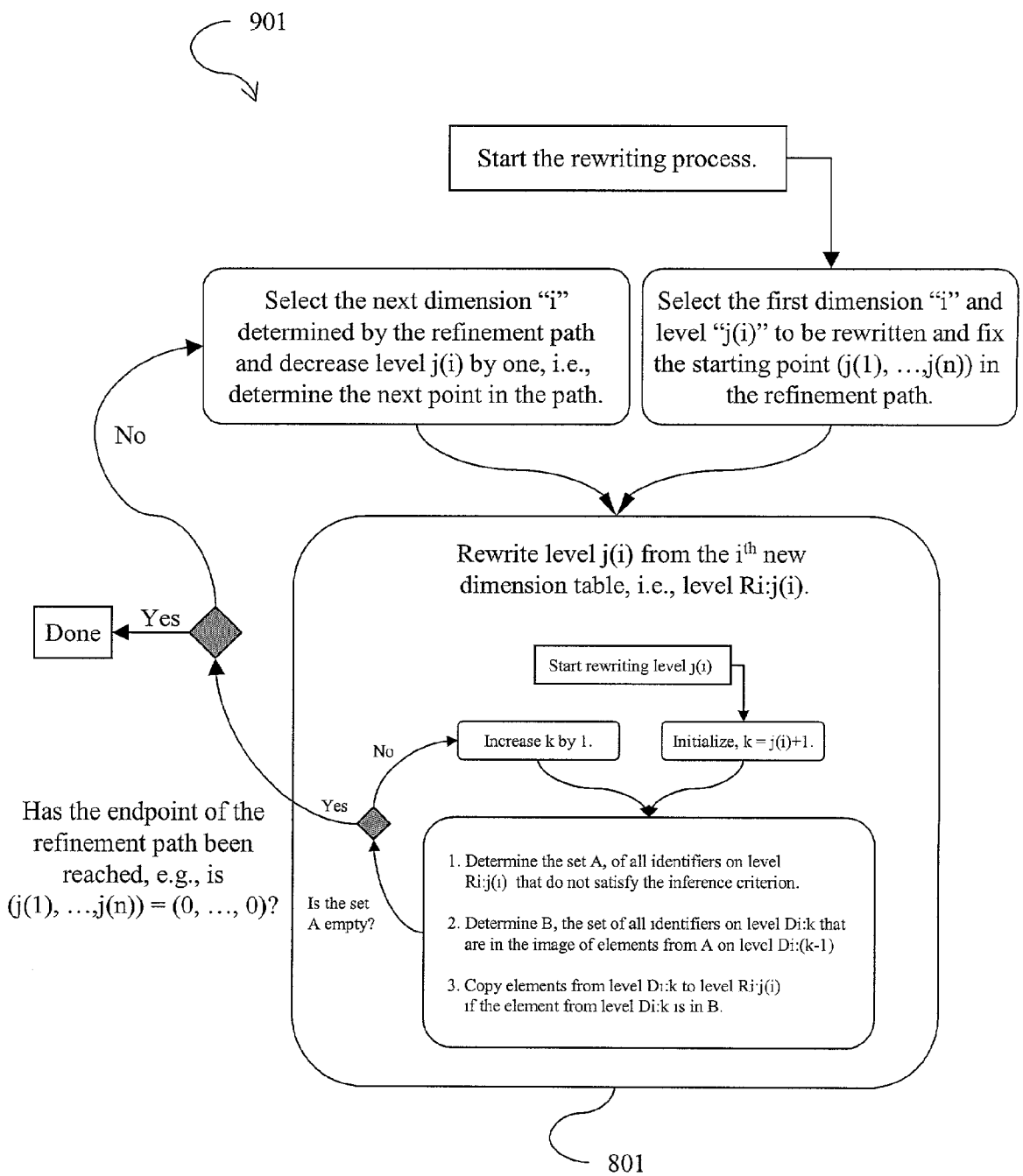
FIG. 9 illustrates an algorithm (procedure) used to rewrite multiple levels from dimension tables, as directed by a refinement path, in a star schema or another hypercube realization.

Let ($v_0, v_1, ..., v_m$) be a refinement path, with $v_m$ pointing to the finest levels, the origin, and be such that the given normal criterion is satisfied by $v_0$. Then the algorithm 801 illustrated on FIG. 8 and explained above, may be used repeatedly to edit the cube in such a way that the criterion will eventually be satisfied also for the modified finest levels R1:0, R2:0, ..., Rn:0 in the hypercube realization. Consequently, the criterion will also be satisfied by any combination of coarser modified levels R1:$j_1$, ..., Rn:$j_n$. FIG. 9 is illustrative.

Before the process 901 (FIG. 9) starts all the dimension tables 202, 203, 204 may need to be modified or recreated with each level represented by two synchronized columns as illustrated by table 402 from FIG. 4. Then algorithm 801 is applied to the point (j(1), ..., j(n))=$v_1$ in the refinement path to rewrite the new j(i)-th level, Ri:j(i), from the selected dimension i=$r_1$, then 801 is applied again to the next point in the refinement path (j(1), ..., j(n))=$v_2$ to rewrite the new j(i)-th level from the next selected dimension i=$r_2$, and so on. As shown in FIG. 9, this continues until algorithm 801 has been applied to the last point, the origin, (j(1), ..., j(n))=$v_m$ to rewrite the new finest level of the last dimension i=$r_m$ in the list of selected dimensions. After the process 901 is completed the modified dimension tables may be cleaned up as illustrated by table 403 from FIG. 4.

Rewriting Algorithms: Rewriting Multiple Projections

Many applications of the above algorithms require inference or other criteria to be applied to projections of the hypercube separately. A projection of a hypercube may be obtained by simply ignoring some of the dimensions from the cube. The cube may, for example, be required to satisfy a particular criterion for the datasets determined by fixing a pair of attributes ($a_i, a_j$) from any pair (i,j) of dimensions. This is equivalent to requiring that the criterion being satisfied by each of the projections of the cube onto any pair of dimensions. At the same time, associated with each projection, a different criterion may be used. The algorithm (procedure) 1001 illustrated on FIG. 10 may be used to modify a hypercube so that various projections satisfy multiple criteria.

Let $Z_1, ..., Z_t$ be a collection of projections, i.e., $Z_p$ specifies a subset of the dimensions from a given hypercube. Associated with each projection $Z_p$ is a normal criterion $c_p$ specifying a conditional column function that may be applied to subsets of rows from the Horizontal-Structure-View associated with the hypercube. Also, associated with each projection $Z_p$ is a refinement path $v^p$ defined among the levels from the projection $Z_p$ and such that the criterion $c_p$ is satisfied by the starting point of the path.

Before the rewriting process starts, all the dimension tables 202, 203, 204, or at least all the dimension tables being rewritten, may need to be modified or recreated with each level represented by two synchronized columns as illustrated by table 402 from FIG. 4. Optionally, it may be desirable to repeat the finest column three times in the new dimension tables as explained below—to store the finest levels in three different states simultaneously.

Figure 10:
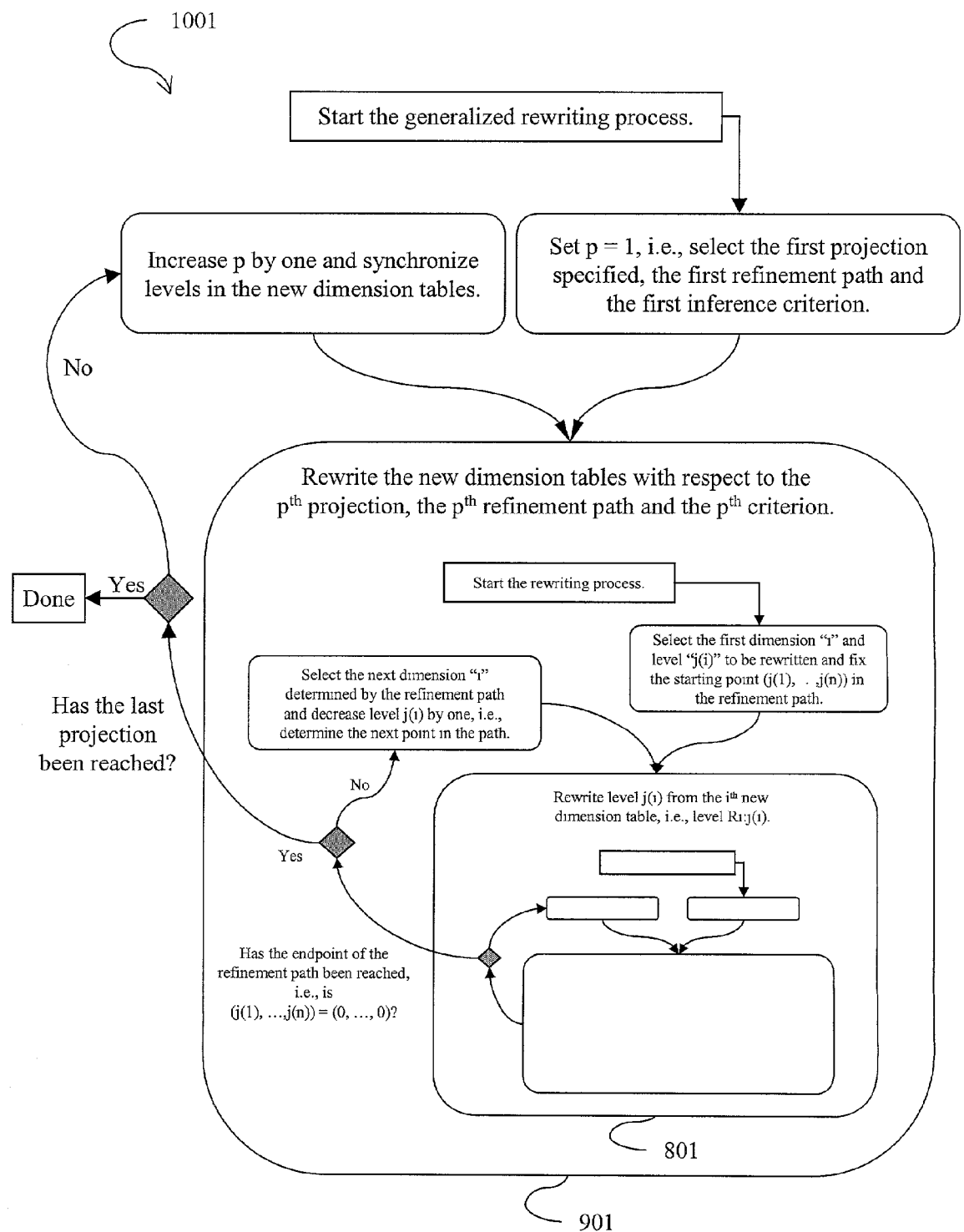
FIG. 10 illustrates an algorithm (procedure) used to modify one or more projections in a star schema or another hypercube realization.

The first step in the rewriting process, identified by 1001 on FIG. 10, is to apply algorithm (process) 901 to the hypercube determined by projection $Z_1$ using the first refinement path $v^1$ and the criterion $c_1$ selected.

Before algorithm (process) 901 can be applied to the next projection, the levels in the new dimension tables need to be synchronized in such a way that the original levels need to be updated to represent the modified levels. It has been pointed out earlier that the original finest levels should not be modified in order not to invalidate the entity relationship between the new dimension tables and the original fact table. One therefore may choose to have one additional finest column, i.e., a total of three, available in the new dimension tables that preserve this relationship and that is never changed. This is not a requirement since a close look at algorithm (procedure) 801 reveals a simple workaround, e.g., it is sufficient to point the algorithm to the new finest levels Ri:0 directly, instead of the original finest levels Di:0.

The next step in the rewriting process 1001 is to apply algorithm 901 to the cube determined by projection $Z_2$ using the second refinement path $v^2$ and the criterion $c_2$ selected. Since the columns in the dimension tables were synchronized, before this step, then, once it is completed, the resulting hypercube satisfies both of the criterion $c_1$ and $c_2$ simultaneously for each of the projections $Z_1$ and $Z_2$, respectively. The synchronizing process is now repeated before 901 is applied to the next projection and so on. This continues until algorithm 901 has been applied to the last projection, denoted here by $Z_t$, using criterion $c_t$ and refinement path $v^t$. After the process 1001 is completed the modified dimension tables may be cleaned up as illustrated by table 403 from FIG. 4. These steps are illustrated by algorithm 1001 from FIG. 10. The resulting modified hypercube satisfies all the criteria specified simultaneously.

CONCLUSION

The invention may be implemented as any suitable combination of hardware and software. While particular embodiments have been described, various other modifications will be apparent to those skilled in the art.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer implemented system for editing a data cube with respect to a normal criterion, the criterion initially satisfied by some but not all dimension level combinations in said data cube, the system comprising:
    a dimension structure modeling the data cube, the dimension structure including dimension levels of the data cube; and
    means for editing the dimension structure of said data cube so that said normal criterion is satisfied by at least one additional dimension level combination, wherein the means for editing forms a modified data cube in which said criterion is satisfied by all the dimension level combinations of the modified data cube.

2. The system of claim 1 further comprising:
    a projection of said data cube; and
    wherein the means for editing edits a dimension structure of the projection of said data cube and forms a modified projection in which said criterion is satisfied by all dimension level combinations from said modified projection.

3. The system of claim 2 wherein the means for editing includes editing dimension structures so that one or more normal criterion associated with one or more projections of said data cube are satisfied by all dimension level combinations from said projections, thereby allowing complex criteria, including inference control criteria required to enforce identity protection requirements for subjects of research studies, to be satisfied by the data cube.

4. The system of claim 1 wherein the data cube is realized as a star schema in an SQL relational database.

5. The system of claim 1 further including means for associating with the dimension structure of said data cube, an intensity function revealing intensity of patterns or structures in said data cube;
    wherein the means for editing utilizes said function in editing of said dimension structure, including enabling the editing process to avoid invalidating useful patterns and structures expressed by said data cube.

6. The system of claim 5 wherein said intensity function and said editing are used to rewrite the dimension structure of said data cube in order to express more clearly, to a user of the system, correlations existing in said data cube, such that discovery of hidden relationships expressed by the data cube is enabled.

7. A computer implemented method for editing a data cube with respect to a normal criterion, the criterion initially satisfied by some but not all dimension level combinations in said data cube, comprising the steps of:
    providing a dimension structure modeling the data cube, the dimension structure having dimension levels of data of the data cube; and
    editing the dimension structure of said data cube so that said normal criterion is satisfied by at least one additional dimension level combination, wherein said editing forms a modified data cube in which said criterion is satisfied by all the dimension level combinations of the modified data cube.

8. The method of claim 7 wherein the step of editing further includes forming a modified data cube in which said criterion is satisfied by all the dimension level combinations of the modified data cube.

9. The method of claim 7 further comprising the step of providing a projection of said data cube, wherein the step of editing further includes (a) editing a dimension structure of the projection of said data cube, and (b) forming a modified projection in which said criterion is satisfied by all dimension level combinations from said modified projection.

10. The method of claim 9 wherein the step of editing includes editing dimension structures so that one or more normal criterion associated with one or more projections of said data cube are satisfied by all dimension level combinations from said projections, thereby allowing complex criteria, including inference control criteria required to enforce privacy requirements for subjects of research studies, to be satisfied by the data cube.

11. The method of claim 7 wherein the data cube is realized as a star schema in an SQL relational database.

12. The method of claim 7 further including:
    associating with the dimension structure of said data cube, a function revealing intensity of patterns or structures in said data cube; and
    using said function to direct said editing of said dimension structure, such that the step of editing avoids invalidating useful patterns and structures expressed by said data cube.

13. The method of claim 12 further comprising the step of using said function with said editing to rewrite the dimension structure of said data cube in order to express more clearly, to a user, correlations existing in said data cube in a manner enabling users to discover hidden relationships expressed by the data.

14. A computer implemented system for editing a data cube with respect to a normal criterion, the criterion initially satisfied by some but not all dimension level combinations in said data cube, the system comprising:
- a dimension structure of the data cube, the dimension structure including dimension levels of the data cube;
- means for editing the dimension structure of said data cube so that said normal criterion is satisfied by at least one additional dimension level combination; and
- means for associating with the dimension structure of said data cube, an intensity function revealing intensity of patterns or structures in said data cube;
- wherein the means for editing utilizes said function in editing of said dimension structure, including enabling the editing process to avoid invalidating useful patterns and structures expressed by said data cube, and wherein the means for editing forms a modified data cube in which said criterion is satisfied by all the dimension level combinations of the modified data cube.

15. A system as claimed in claim 14 wherein said intensity function and said editing are used to rewrite the dimension structure of said data cube in order to express more clearly, to a user of the system, correlations existing in said data cube, such that discovery of hidden relationships expressed by the data cube is enabled.

16. A computer implemented method for editing a data cube with respect to a normal criterion, the criterion initially satisfied by some but not all dimension level combinations in said data cube, comprising the steps of:
- providing a dimension structure of the data cube, the dimension structure having dimension levels of data of the data cube;
- editing the dimension structure of said data cube so that said normal criterion is satisfied by at least one additional dimension level combination;
- associating with the dimension structure of said data cube, a function revealing intensity of patterns or structures in said data cube; and
- using said function to direct said editing of said dimension structure, such that the step of editing avoids invalidating useful patterns and structures expressed by said data cube, wherein said step of editing forms a modified data cube in which said criterion is satisfied by all the dimension level combinations of the modified data cube.

17. The method of claim 16 further comprising the step of using said function with said editing to rewrite the dimension structure of said data cube in order to express more clearly, to a user, correlations existing in said data cube in a manner enabling users to discover hidden relationships expressed by the data.

* * * * *